United States Patent Office 3,560,448
Patented Feb. 2, 1971

3,560,448
SYNTHETIC POLYAMIDES
John Ewart Lodge, Pontypool, England, assignor to Imperial Chemical Industries Limited, London, England
No Drawing. Filed Aug. 31, 1967, Ser. No. 664,640
Claims priority, application Great Britain, Sept. 13, 1966, 40,815/66
Int. Cl. C08g 20/00
U.S. Cl. 260—78                                         11 Claims

ABSTRACT OF THE DISCLOSURE

A linear fiber-forming copolyamide of the mixture of (1) an aliphatic diamine and an aliphatic dicarboxylic acid or (2) an aliphatic amino carboxylic acid with (3) a metal salt of 9,9-bis omega carboxy alkylfluorene mono or disulfonic acid and an aliphatic diamine.

This invention relates to the manufacture of synthetic linear polymers and more particularly to synthetic linear copolyamides containing fluorene sulphonic acid residues in the carbon chain, and to shaped articles made therefrom.

High molecular weight synthetic linear polyamides, by which is meant polyamides of sufficiently high molecular weight to be capable of being melt spun, have long been known and some are manufactured on a large scale for melt-spinning into filaments by the polycondensation of low molecular weight diamines and dicarboxylic acids or of amino-carboxylic acids. For example, polyhexamethylene adipamide may be made by the condensation of hexamethylene diamine and adipic acid. A similar polyamide is obtainable by the polycondensation of omega-amino-caproic acid. In place of the latter the corresponding lactam, namely epsilon-caprrolactam can be polymerised so as to afford a polyamide.

Such polyamides, e.g. polyhexamethylene adipamide, may be melt-spun into filaments having many attractive textile properties including a high tenacity and resistance to abrasion. The filaments are commonly dyed by acid dyestuffs but basic dyestuffs can also be used though in the case of the latter it is desirable to select those possessing good fastness to light.

Much attention has been paid particularly in recent years to the problem of modifying polyamides so as to increase or decrease their dyeability, i.e. the depth of shade obtained with a given dyestuff under given conditions. The reason for the interest in this problem is as follows. If a fabric is knitted or woven or otherwise fabricated of two or more polyamides of different dyeabilities, a pattern can immediately be obtained by a single dyeing operation, which constitutes an attractive commercial proposition.

Whilst polyamides can be modified for the above purpose by the physical application or incorporation of suitable agents it is preferable that the latter be built into the polyamide chain, i.e. chemically combined therewith, because more permanent effects are thereby obtained. For example, if bifunctional compounds capable of taking part in the polyamide polycondensation and bearing, say, sulphonic acid groups, are included in the starting materials used in the manufacture of the polyamide they will form part of the linear polyamide chain and the additional sulphonic acid groups will increase the dyeability of the resulting polyamide with respect to basic dyestuffs whilst reducing the uptake of acid dyestuffs. Suitable bifunctional compounds for taking part in the aforesaid condensation reaction have, for instance, a plurality (especially two) of amino and/or carboxyl groups. Thus dicarboxy aromatic sulphonates can be used to give polyamides dyeing more deeply with basic dyestuffs.

It has now been found that very useful dicarboxy aromatic sulphonates for this purpose are fluorene mono- and di-sulphonates bearing in the 9 positions two omega-carboxyalkyl groups, said groups having up to 10 carbon atoms, e.g. beta-carboxyethyl. Instead of the carboxy groups functionally equivalent groups e.g. the amide, the ester, the acid chloride or the nitrile (used in the presence of water) group may be employed. All these groups yield amide links and consequently produce the same polyamide. The sulphonates are of monovalent metals preferably sodium or divalent metals, especially the basic organic salts of a divalent metal e.g. calcium benzoate, calcium acetate, zinc acetate, strontium formate, stannous valerate. The fluorene intermediate may be added to the reagents or melt before, during or after the polyamide polymerisation or polycondensation and should be employed in a molecular proportion not exceeding 10% so that not more than 10% of the repeating amide units contain fluorene nuclei. In other words the number of moles of the fluorene intermediate used must not exceed $\frac{1}{10}$ the number of moles of dicarboxylic acid or amino carboxylic acid employed in making the polyamide. Not less than ¼ mol. percent of the fluorene compound should be used and the preferred proportion is ½-5 mol. percent.

Accordingly from one aspect this invention provides a linear synthetic co-polyamide derived from an approximately equi-molecular mixture of an aliphatic alpha, omega diamine having from 4–20 carbon atoms and an aliphatic alpha, omega dicarboxylic acid having from 6–22 carbon atoms, and/or an aliphatic omega-amino carboxylic acid containing from 5–21 carbon atoms or polyamide-forming functional derivatives thereof, and a molecular proportion with respect to the foregoing acids of from 0.25% to 10% of a metal salt of 9,9-bis omega carboxyalkylfluorene mono- or di-sulphonic acid or a polyamide-forming functional derivative thereof together with the same molecular quantity of an aliphatic alpha, omega-diamine having from 4–20 carbon atoms.

The invention also includes textile yarns, including monofilaments, spun from the copolyamide defined above.

From another aspect the present invention provides novel fluorene compounds included in the expression 9,9-bis-omega-carboxylalkylfluorene mono- or di-sulphonic acid and their metal salts, especially the alkali and alkaline earth metal salts, the latter preferably being in the form of their basic organic salts such as, for example, calcium benzoate, calcium acetate, zinc acetate, strontium formate, or stannous valerate.

From yet a further aspect the invention provides a process for the manufacture of a linear co-polyamide comprising heating together to effect polymerisation a first polyamide or polyamide-forming reactants, and a second polyamide or polyamide-forming reactants, the first polyamide being derived from approximately equi-molecular proportions of an aliphatic alpha, omega-diamine having from 4–20 carbon atoms, and an aliphatic alpha-omega dicarboxylic acid having from 6–22 carbon atoms, and/or an aliphatic omega-amino carboxylic acid containing from 5–21 carbon atoms or polyamide-forming functional derivatives thereof, and the second polyamide being derived from a molecular proportion with respect to the foregoing acids of from 0.25% to 10% of a metal salt of 9,9-bis omega-carboxylalkylfluorene mono or di-sulphonic acid or a polyamide-forming functional derivative thereof together with the same molecular quantity of an aliphatic alpha, omega-diamine having from 4–20 carbon atoms.

Preferably the fluorene sulphonic acid is in the form of its amide derivative, i.e. the metal salt of 9,9-bis carbamyl alkyl fluorene mono- or di-sulphonic acid and the most preferred derivative is di-sodium bis beta-carbamylethyl fluorene-2,7-sulphonate.

Examples of the aliphatic diamines are:

Hexamethylene diamine
3-methylhexamethylene diamine
Tetramethylene diamine
Decamethylene diamine
Octamethylene diamine
1:6-dimino-6-methylheptane.

Examples of the aliphatic dicarboxylic acids are:

Adipic acid
Beta-methyladipic acid
Sebacic acid
Pimelic acid
Hexadecamethylene dicarboxylic acid.

Examples of the sulpho-bis-carboxyalkylfluorene are:

Disodium 9,9-bis-beta-carboxyethylfluorene-2,7-disulphonate
Sodium 9,9-bis-beta-carboxyethylfluorene-2-sulphonate
Potassium 9,9-bis-beta-carboxyethylfluorene-2-sulphonate
Lithium 9,9-bis-gamma-carboxypropylfluorene-2-sulphonate
Sodium 9,9-bis-delta-carboxybutylfluorene-2-sulphonate
2-benzoyloxybariumsulpho-9,9-bis-beta-carboxyethylfluorene
2,7-bis-acetoxy bariumsulpho-9,9-bis-beta-carboxyethylfluorene
2,7-bis-hexanoyloxymagnesiumsulpho-9,9-bis-delta-carboxybutylfluorene.

In place of the approximately equi-molecular mixture of the aliphatic diamine and dicarboxylic acid, there may conveniently be employed polyamide-forming functional derivatives such as the diamine-dicarboxylic acid salt derived therefrom, e.g. hexamethylene diammonium adipate (derived from hexamethylene diamine and adipic acid). Thus, for instance, a copolyamide according to the invention may be made by heating together 78.6 parts by weight of hexamethylene diammonium adipate and 3.2 parts by weight of hexamethylene diammonium sodium 9,9-bis-beta-carboxyethylfluorene-2-sulphonate (i.e. 2 molar percent). As already mentioned the starting materials used in making the present copolyamides may be brought together in any desired order. If the salts are employed, as just mentioned, the fluorene salt can be added to the hexamethylene diammonium adipate and the two heated together in order to effect polymerisation, or the fluorene salt can be added to the reaction mixture during the polymerisation of the hexamethylene diammonium adipate or else the two salts can be polymerised separately by heating, and the resulting polyamides then heated together in order to bring about amide interchange and thus produce the required copolyamide. Thus a copolyamide can be made by (1) first polymerising e.g. over 10% of the fluorene salt monomer with, say, hexamethylene diammonium adipate, (2) separately polymerising a further proportion of hexamethylene diammonium adipate to produce polyhexamethylene adipamide and (3) heating the two polymers together to effect interaction (amide interchange) whereby a copolyamide is obtained similar to that which would have resulted if all the hexamethylene diammonium adipate had been heated with the fluorene salt monomer in one polymerisation. Other salts which may be used in conjunction with the latter starting material are:

Hexamethylene diammonium sebacate
Octamethylene diammonium adipate
Pentamethylene diammonium sebacate
Dodecamethylene diammonium adipate.

If desired, the diamines may be used in the form of their N-formyl derivatives or other functional polyamide-forming derivatives; likewise the acids may be employed in the form of their ethyl esters for example.

Likewise instead of the amino-carboxylic acids the chemically equivalent lactams derived therefrom may be employed. Examples of suitable amino-carboxylic acids and lactams are:

Epsilon-aminocaproic acid
Epsilon-caprolactam
Omega-aminoundecanoic acid
Omega-aminoheptanoic acid.

More than one of the aforesaid starting materials, namely, diamines, dicarboxylic acids or amino-carboxylic acids or their chemical equivalents, may be employed. Amongst the reagents employed in making the present polyamides there may be included monofunctional compounds in small quantity, notably monoamines or monobasic acids, e.g. acetic acid, in order to prevent polymerisation proceeding beyond the desired degree at elevated temperatures, for example, when the polyamide is held molten for the purpose of melt-spinning it into filaments. Such monofunctional compounds are known as viscosity stabilisers. In the case of the manufacture of a polyamide from a diamine and a dicarboxylic it is also possible to control the degree of polymerisation by employing a suitable excess the diamine or of the dicarboxylic acid. Other adjuvants may also be incorporated in the polyamides at any convenient stage of their manufacture, for instance: Dyestuffs, pigments, dyestuff-formers, plasticisers, delustrants, resins.

In the following examples which are by way of illustrating not limiting the invention the parts are parts by weight.

EXAMPLE 1

2.64 parts of sodium 9,9-bis-beta-carboxyethyl-fluorene-2-sulphonate (i.e. 2 molar percent), 6515 parts of hexamethylene diammonium adipate and 0.58 part of hexamethylene diamine are heated at 220° C. for 3 hours under nitrogen in a sealed vessel. The heating is continued at 285° C. under nitrogen at atmospheric pressure for 2 hours more. The resulting white polymer on analysis has:

Amine end groups 38.8 gram equivalents per million grams
Carboxyl end groups 55 gram equivalents per million grams
Inherent Viscosity 1.12.

(N.B.—The free amine and carboxyl end groups are determined by appropriate titration methods. The Inherent Viscosity is defined as twice the natural logarithm of the quotient of the viscosity at 25° C. of a solution of ½% weight by volume of the polyamide dissolved in 90% weight by weight aqueous phenol solution as solvent divided by the viscosity of the said solvent at the same temperature.)

The polymer is rod-spun at 290° C. to give a five-filament yarn which is drawn. The latter absorbs under comparable conditions only a few percent of the dyestuff Acid Blue 45 of the Colour Index which is taken up by polyhexamethylene adipamide yarn.

The sodium 9,9-bis-2-beta-carboxyethylfluorene-2-sulphonate is obtained by sulphonating the parent bis-carboxyethylfluorene with concentrated sulphuric acid, recrystallising the acid from its solution in hot concentrated hydrochloric acid, which is pumped with charcoal, and neutralising with sodium hydroxide.

EXAMPLE 2

8000 parts of hexamethylene diammonium adipate, 250 parts (i.e. 2 molar percent) of sodium 9,9-bis-2-beta-carboxyethylfluorene-2-sulphonate, 69.5 parts of hexamethylene diamine, 9 parts of acetic acid and 3000 parts of water are stirred together in an autoclave and heated to 205° C. during 1 hour reaching a pressure of 250 lbs./sq. in. The temperature is then raised to 240° C. during 1 hour whilst the pressure is maintained (by a spring loaded escape valve). During the next (third) hour the pressure is allowed to fall to one atmosphere while the temperature is raised further to 275° C.; the polymer is finally heated at 285° C. for 35 minutes.

The resulting white polymer which possesses a Relative Viscosity of 34.1 is melt-spun under steam to give a yarn of 20 filaments. The latter are drawn to 3.66 times their original length and then have a total denier of 70 and 30% extensibility at break.

The Relative Viscosity is determined by dividing the viscosity of an 8.4% solution of the polymer in 40% aqueous formic acid at 25° C. by the viscosity of the said aqueous formic acid at the same temperature.

The yarn on analysis proves to have 25.5 gms. eqts. of amine ends and 95 gms. eqts. of carboxyl ends per million gms.; the Relative Viscosity is 33.2.

A hank of the yarn is immersed for 3 hrs. in 200 times its weight of a 0.05% aqueous solution of Acid Blue No. 45 containing 1% of acetic acid, but is hardly stained. The amount of dyestuff taken up, equivalent dye uptake (E.D.U.) is measured by dissolving 50 mg. of the yarn in 20 ml. of 40% sulphuric acid and measuring the optical density at 430 m$\mu$ in a Unicam S.P. 600 spectrophotometer. The dyestuff taken up by polyhexamethylene adipamide yarn under the same conditions is 14 times as much. In the case of the copolyamide which contains piperazine rings about 40 times as much dyestuff is absorbed.

EXAMPLE 3

Example 2 is repeated except that instead of 250 parts of sodium 9,9-bis-2-beta-carboxyethylfluorene-2-sulphonate, 154 parts (1 molar percent) of disodium-9,9-bis-beta carboxyethyl-fluorene-2,7-disulphonate is employed and only 34.75 parts of hexamethylene diamine.

The resultant polyamide has a Relative Viscosity of 33.8.

The polymer is melt-spun under steam to produce a 20-filament yarn of 245 total denier. The latter after drawing at a ratio of 3.66 to reduce the denier to 70 has an extensibility of 30%.

Similar dyeing results are obtained to those of Example 2, since although only 1 molar percent is employed of the fluorene sulphonic acid, the later is in the present example a disulphonic acid.

EXAMPLE 4

8000 parts of hexamethylene diammonium adipate, 34.75 parts of hexamethylene diamine, 154 parts of disodium 9,9 - bis-beta-carbamylethylfluorene-2,7-disulphonate (i.e. 1 molar percent) and 3000 parts of water containing 9.0 parts of acetic acid are polymerised by the process described in Example 2. The resulting copolyamide has a Relative Viscosity of 34 and a Vicat softening point of 257° C.

The Vicat points or softening temperatures alluded to have been determined by a penetrometer similar to the apparatus described by Edgar and Ellery at p. 1638 of the Journal of the Chemical Society, 1952.

The bis-carbamylethylfluorene sulphonate is made by adding 60 parts of 9,9-di-beta-cyanoethylfluorene during 1 hour to 190 parts of stirred concentrated sulphuric acid cooled in a water bath at 15° C. The stirred solution is heated at 100° C. for 2 hours and, after cooling to 20° C., slowly poured on to 400 parts of ice. The white precipitate is dissolved in 200 parts of water at 0° C. and 15 parts of sodium chloride dissolved in 60 parts of water added with stirring. After cooling to —2° C. the precipitate is separated and dried at 80° C. in vacuo. (Theory N=5.47; found 5.4%.)

The polymer is melt-spun under steam into a 20-filament yarn, which on drawing at a ratio of 3.66 has a total denier of 70, and an extensibility of 30%.

The yarn with 0.4 turn per inch twist is crimped (18-25 crimps per inch) on a false-twist machine and weft knitted with on a flat bed machine, medium gauge, together with the yarn containing piperazine rings referred to in Example 2 above to produce a striped fabric. The latter is immersed in 50 times its weight of the following dyebath, heated to boiling during ½ hour and boiled for 1 hour, washed and dried.

Dyebath 1 litre of water containing:

1 gm. sodium dihydrogen phosphate
1 gm. disodium hydrogen phosphate
1 gm. Reactive Blue No. 10 (Colour Index)
1 gm. Basic Red No. 23 (Colour Index).

The fabric is dyed in red and blue stripes.

EXAMPLE 5

7074 parts of hexamethylene diammonium adipate, 348 parts of hexamethylene diamine, 1536 parts of disodium 9,9-bis-beta-carbamylethylfluorene-2,7-disulphonate (i.e. 10 molar percent) and 3000 parts of water containing 9.0 parts of acetic acid are polymerised by the process described in Example 2. The resulting copolyamide is mixed in granular form with 9 times its weight of polyhexamethylene adipamide and melt-spun at 285° C. under steam into 20-filament yarn similar to that obtained in Example 4. (N.B.—The heating of the molten mixed polyamides during melt-spinning causes interaction whereby a copolyamide is produced having fluorene nuclei in 1% of its repeating amide units.)

EXAMPLE 6

7467 parts of hexamethylene diammonium adipate, 174 parts of hexamethylene diamine, 768 parts of disodium 9,9-bis-beta-carbamylethylfluorene-2,7-disulphonate (i.e. 5 molar percent) and 3000 parts of water containing 9.0 parts of acetic acid are polymerised according to its process of Example 2. The copolyamide has a Relative Viscosity of 35.

Polyethylene terephthalate yarn, is poorly dyed by basic dyestuffs. However yarn made from polyethylene terephthalate which has been mixed, by stirring molten at 300° C., with 25% of its weight of the above copolyamide, is dyed much more deeply by basic dyestuffs.

EXAMPLE 7

1695 parts of epsilon-caprolactam, 43.5 parts of hexamethylene diamine, 230 parts of disodium 9,9-bis-beta-carbamylethylfluorene-2,7-disulphonate and 1200 parts of water containing 4.5 parts of acetic acid are heated to 210° C. in an autoclave under nitrogen during 100 minutes, the pressure rising to 250 lbs./sq. in. The temperature is further raised to 270° C. during 60 minutes, the pressure (by an escape valve) not being allowed to exceed 250 lbs./sq. in. The pressure is then released, falling to atmospheric during 60 minutes, and the polymerisation mixture heated at 285° C. for 35 minutes. The resulting copolyamide has a Relative Viscosity of 26.0.

Polypropylene yarn is hardly stained by basic dyestuffs. Polypropylene is mixed molten at 230° C. with 25% of its weight of the above copolyamide and melt-spun into yarn. The latter has a high affinity for basic dyestuffs such as Basic Red No. 23 (Colour Index).

EXAMPLE 8

9.19 parts of disodium 9,9 - bis-beta-carbamylethylfluorene-2,7-disulphonate (i.e. 1 molar percent) was added to 1000 parts of 45% w./w. hexamethylene diammonium adipate solution in water. The mixed solution was pumped at a rate of 154 gms. per minute through a continuous polymerisation apparatus such as that described in British Pat. No. 924,630. Hexamethylene diamine (6% w./w. in water) containing 0.24% acetic acid was also added at a rate of 13 gms./minute. The polymer so produced was immediately spun to give a 13 filament yarn possessing the following chemical properties:

Relative viscosity _____ 36.0
Amine end group content (g./$10^6$ g.) _____ 43.1
Carboxyl end group content (g./$10^6$ g.) _____ 94.0

The yarn after drawing at a ratio of 2.78 to reduce the denier to 40 had an extension at break of 40%.

Dyeing of above yarn

At pH 3.0 the above yarn exhibited an E.D.U. of Acid Blue 45 (Colour Index) one thirtieth (1/30) of that of a yarn of similar chemical properties but containing no sulphonate groups.

EXAMPLE 9

An autoclave was charged with 1566 kg. of 85% solution of hexamethylene diammonium adipate in water to which was added before charging 130 kg. of a 20% w./w. solution of disodium 9,9-bis-beta-carbamylethylfluorene-2,7-disulphonate (1 molar percent), 12.21 kg. of 60% w./w. aqueous hexamethylene diamine (1.28 molar percent) and 1.46 kg. acetic acid (0.48 molar percent). Polymerisation was effected as described in Example 2.

The polymer so produced possessed the following chemical properties.

Relative viscosity _____ 31.3
Amine end groups content (g./$10^6$ g.) _____ 45
Carboxyl end group content _____ 90.4

This polymer was spun under steam to give a 235 denier yarn of 20 filaments. The yarn after drawing at a ratio of 3.62 to reduce the denier to 70 has an extension at break of 30% and chemical properties.

Relative viscosity _____ 31.3
Amine end group content (g./$10^6$ g.) _____ 44.1
Carboxyl end group content (g./$10^6$ g.) _____ 84

Dyeing of above yarn

At pH 3.0 the above yarn exhibited an E.D.U. of Acid Blue 45 (Colour Index) one thirtieth (1/30) of that of a yarn of similar chemical properties but containing no sulphonate groups.

EXAMPLE 10

7930 parts of caprolactam, 3000 parts of water, 715 parts of a 25.3% w./w. solution of disodium 9,9-bis beta carbamylethyl fluorene-2,7-disulphonate in water and 68.5 parts of 60% w./w. solution of hexamethylene diamine in water were charged under nitrogen to an autoclave. The temperature was raised over 1 hour to 220° C. and a steam pressure of 250 p.s.i. over the next hour the temperature was raised to 270° C. and steam bled off slowly reducing the pressure to 180 p.s.i. whilst during the next hour the temperature was raised to 285° C. and the pressure dropped to atmospheric. The molten polymer was held at 285° C. for 45 minutes under an atmosphere of steam before being extruded into a fine lace. The polymer so prepared possessed the following chemical properties.

Relative viscosity _____ 29.4
Amine end group content (g./$10^6$ g.) _____ 52.5
Carboxyl end group content (g./$10^6$ g.) _____ 55

This polymer was spun at 270° C. to yield a 20 filament yarn of 400 denier. The yarn after drawing at a ratio of 3.31 to reduce the denier to 114 has an extension at break of 40%. Yarn chemical properties.

Relative viscosity _____ 30.1
Amine end group content (g./$10^6$ g.) _____ 51.7
Carboxyl end group content (g./$10^6$ g.) _____ 54

Dyeing of above yarn

At pH 3.7 the above yarn possessed an E.D.U. of Acid Blue 45 (Colour Index) one sixtieth (1/60) of that of a polycaproamide containing no sulphonate groups. Similarly at pH 3.0 the E.D.U. of the sulphonate yarn to Basic Orange 28 (Colour Index) was 13 times that of the unsulphonated yarn.

EXAMPLE 11

7543 parts of hexamethylene diammonium dodecamethylene dioate, 445 parts of a 25.3% w./w. solution of disodium 9,9-bis-beta carbamylethyl fluorene-2,7-disulphonate in water (1 molar percent) and 72.5 parts of 60% w./w. solution of hexamethylene diamine were charged under nitrogen to an autoclave. Polymerisation was effected as described in Example 2 to produce a white polymer possessing the following properties.

Inherent viscosity _____ 1.15
Amine end group content (g./$10^6$ g.) _____ 64.4
Carboxyl end group content (g./$10^6$ g.) _____ 51.0

This polymer was melt spun under a steam atmosphere to 270° C. to yield a 20 filament yarn of 262 denier. After drawing at a ratio of 3.31 to reduce the denier to 75 the yarn has an extension at break of 20%. The chemical properties of the yarn were.

Inherent viscosity _____ 1.06
Amine end group content (g./$10^6$ g.) _____ 67
Carboxyl end group content (g./$10^6$ g.) _____ 53

Dyeing of the above yarn

At pH 3.7 the above yarn possessed an E.D.U. of Acid Blue 45 (Colour Index) 1/30 of that of polyhexamethylene dodecamethylene dioamide prepared without the disodium 99 bis-beta-carbamylethyl fluorene-2,7-disulphonate. Similarly at pH 3.0 the E.D.U. of the sulphonate yarn to Basic Orange 28 (Colour Index) was 9 times that of the unsulphonated yarn.

What I claim is:

1. A linear synthetic fiber-forming copolyamide consisting essentially of the polymeric condensation product of approximately equi-molecular mixture of an aliphatic alpha omega diamine having from 4–20 carbon atoms and an aliphatic alpha omega dicarboxylic acid having from 6–22 carbon atoms or an aliphatic omega-amino carboxylic acid containing from 5–21 carbon atoms or polyamide-forming functional derivatives thereof, and a molecular proportion with respect to the foregoing acids of from 0.25% to 10% of a metal salt of 9,9-bis omega carboxyalkylfluorene mono or disulphonic acid or a polyamide-forming functional derivative thereof together with the same molecular quantity of an aliphatic alpha, omega-diamine having from 4–20 carbon atoms.

2. A copolyamide according to claim 1 wherein the molecular proportion of the fluorene sulphonic acid is from 0.5% to 5.0%.

3. A copolyamide according to claim 1 wherein the first mentioned diamine is hexamethylene diamine and the first mentioned carboxylic acid is adipic acid or dodecanoic acid.

4. A copolyamide according to claim 1 derived from a polyamide-forming functional derivative of an aliphatic omega-amino carboxylic acid, namely caprolactam.

5. A copolyamide according to claim 1 wherein the fluorene sulphonic acid is in the form of its alkali metal salt.

6. A copolyamide according to claim 5 wherein the alkali metal is sodium.

7. A copolyamide according to claim 6 wherein the fluorene sulphonic acid derivative is the sodium salt of 9,9-bis-omega-carbamylalkylfluorene mono- or di-sulphonic acid.

8. A copolyamide according to claim 7 wherein the fluorene sulphonic acid derivative is di-sodium 9,9-bis beta-carbamylethylfluorene-2,7-disulphonate.

9. A copolyamide according to claim 1 wherein the fluorene sulphonic acid derivative is in the form of its alkaline earth metal salt.

10. A copolyamide according to claim 9 wherein the alkaline earth metal is in the form of an organoalkaline earth metal sulfonate.

11. A filament of the copolyamide composition of claim 1.

References Cited

UNITED STATES PATENTS

| | | | |
|---|---|---|---|
| 3,143,530 | 8/1964 | D'Onofrio | 260—78 |
| 3,184,436 | 5/1965 | Magat | 260—78 |
| 3,235,533 | 2/1966 | Brinkman | 260—78 |
| 3,287,321 | 11/1966 | Temin | 260—78 |
| 3,296,204 | 1/1967 | Caldwell | 260—78 |
| 3,349,062 | 10/1967 | Hill et al. | 260—78 |
| 3,389,172 | 6/1968 | Burrows et al. | 260—78 |
| 3,409,596 | 11/1968 | Unger et al. | 260—78 |

HAROLD D. ANDERSON, Primary Examiner

U.S. Cl. X.R.

8—55; 57—140; 161—168; 260—29.2